(12) United States Patent
Yamazaki et al.

(10) Patent No.: US 6,483,551 B1
(45) Date of Patent: *Nov. 19, 2002

(54) METHOD FOR DISPLAYING AN IMAGE HAVING A MAXIMAL BRIGHTNESS

(75) Inventors: Shunepi Yamazaki, Tokyo; Akira Mase, Aichi; Masaaki Hiroki; Yasuhiko Takemura, both of Kanagawa, all of (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/039,387

(22) Filed: Mar. 16, 1998

Related U.S. Application Data

(62) Division of application No. 08/835,510, filed on Apr. 8, 1997, now Pat. No. 5,801,791, which is a continuation of application No. 08/462,796, filed on Jun. 5, 1995, now abandoned, which is a division of application No. 07/836,800, filed on Feb. 18, 1992, now Pat. No. 5,825,434.

(30) Foreign Application Priority Data

Feb. 16, 1991 (JP) ................................................ 3-77315
Feb. 5, 1992 (JP) ................................................ 4-54320

(51) Int. Cl.$^7$ .......................... H04N 5/21; H04N 5/217; H04N 5/213; G09G 5/00

(52) U.S. Cl. ...................... 348/629; 348/625; 348/630; 348/614; 348/616; 345/611; 345/615; 345/629

(58) Field of Search ............................ 345/45, 76, 611, 345/615, 629, 673, 641, 589; 348/690, 576, 625, 628, 687, 689, 688, 629–630, 614–616, 584–586, 590, 597–598

(56) References Cited

U.S. PATENT DOCUMENTS

| | | | |
|---|---|---|---|
| 4,437,092 A | 3/1984 | Dean et al. ................ 340/730 |
| 4,581,631 A | 4/1986 | Sonnenberger ............ 358/37 |
| 4,593,310 A | 6/1986 | Songer ....................... 358/37 |
| 4,698,666 A | 10/1987 | Lake, Jr. et al. ........... 340/730 |
| 4,839,836 A | 6/1989 | Fonsalas ................ 348/625 X |
| 4,881,126 A | * 11/1989 | Uesugi et al. ............. 348/687 |
| 4,901,156 A | * 2/1990 | Yook ......................... 348/687 |

(List continued on next page.)

FOREIGN PATENT DOCUMENTS

| | | | |
|---|---|---|---|
| JP | 62-8221 | 1/1987 | |
| JP | 62-144235 | 6/1987 | |
| JP | 63-014577 | 1/1988 | |
| JP | 1-161581 | 6/1989 | |
| JP | 01-234889 | 9/1989 | |
| JP | 2-53392 | 2/1990 | |
| JP | 02-168788 | 6/1990 | |
| JP | 03-18176 | 1/1991 | |
| JP | 3-223894 | 2/1991 | ........... G09G/5/06 |
| JP | 03-126377 | 5/1991 | |

OTHER PUBLICATIONS

"Unsharp Masking", Photographic/Electronic, Lionnie Jackson, GATFWORLD, pp. 13–22.

"Electronic Color Separation", Dr. R.K. Molla, R.K. Printing & Publishing Co., Montgomery, West Virginia, 1988, pp. 230–231.

*Primary Examiner*—Andrew Faile
*Assistant Examiner*—Hai V. Tran
(74) *Attorney, Agent, or Firm*—Eric J. Robinson; Robinson Intellectual Property Law Office, P.C.

(57) ABSTRACT

An electro-optical device and a method for displaying an image are disclosed. A clear image with a clear profile can be displayed therein by processing input image data, for example input image data of TV broadcasting received by the device.

18 Claims, 6 Drawing Sheets

U.S. PATENT DOCUMENTS

| | | | | |
|---|---|---|---|---|
| 5,068,719 A | * | 11/1991 | Tsuji | 348/687 |
| 5,089,891 A | * | 2/1992 | Yamamoto | 348/687 |
| 5,097,337 A | * | 3/1992 | Flamm | 348/690 |
| 5,099,230 A | | 3/1992 | Fuji | 340/730 |
| 5,140,315 A | | 8/1992 | Edelson et al. | 340/730 |
| 5,153,568 A | | 10/1992 | Shaw | 340/703 |
| 5,237,414 A | | 8/1993 | Faroudja | 348/625 X |
| 5,247,352 A | | 9/1993 | Nagler et al. | 358/37 |
| 5,321,511 A | | 6/1994 | Min | 348/625 |
| 5,801,791 A | | 9/1998 | Yamazaki et al. | |
| 5,825,434 A | | 10/1998 | Yamazaki et al. | |

* cited by examiner

METHOD FOR DISPLAYING AN IMAGE HAVING A MAXIMAL BRIGHTNESS

This application is a Divisional of application U.S. Ser. No. 08/835,510, filed Apr. 8, 1997; now U.S. Pat. No. 5,801,791 itself is a continuation of U.S. Ser. No. 08/462,796 (abandoned), filed Jun. 5, 1995; which itself is a division of Ser. No. 07/836,800, filed Feb. 18, 1992 now U.S. Pat. No. 5,825,434.

BACKGROUND OF THE INVENTION

1. Field of the Invention

This invention relates to a display device such as a direct-projection type of television receiver, a projection type display device, an image output device for a computer, etc., which utilizes a cathode-ray-tube (CRT), a liquid crystal device, a plasma device, an electroluminescence device, an electrochromic device or the like. Also, this invention relates to a method for displaying an image.

2. Description of the Prior Art

When a color image is displayed with plural dots in a conventional display device, plural colored areas such as A-colored area, B-colored area, C-colored area, D-colored area, etc., are separately displayed for any color image. Also, in both cases of monochromatic image and color image, the image is displayed with areas having different brightness being separated respectively. In this display manner, a mixing color frequently occurs at a boundary between the different colored areas on the display device, and thus a clear image can not be displayed. Also, color becomes ambiguous at a boundary between the areas having different brightness. This is not only because of the problem of the ability of the display device, but also because high frequency components in the image signal are cut when the image signal is created or processed to send the image signal to the display device, that is, before the image signal is received by the display device. The signal waveform becomes gentle by the cut. This becomes a problem particularly in the case of the display for office automation which requires high definition.

In order to overcome the above disadvantage, the following method has been adopted.

That is, as shown in FIG. 3, an original image data 1 is subjected to a profiling processing to obtain a profile image data 2, and then the original image data 1 and the profile image data 2 are synthesized with each other to obtain a synthesized image data 3, thereby displaying the synthesized image data 3 on the display device.

However, this method requires a very high-speed calculation per frame, and thus has been unsuitable for a dynamical image displaying operation which requires a displaying speed above 60 frames per second.

SUMMARY OF THE INVENTION

It is an object of the present invention to provide novel methods for displaying an image with a clear outline (profile).

It is another object of the present invention to provide an electro-optical device capable of displaying an image with a clear outline (profile).

According to one of the novel methods, the most marginal profile of neighboring same color areas is colored with black, thereby depressing the color mixing between neighboring different color areas.

In accordance with the present invention, an electro-optical device for displaying a color image with a dot matrix comprising dots on plural X-axes and Y-axes in a dot-sequential scanning operation or a line-sequential scanning operation, includes means for converting color data of most marginal positions of plural adjacent image data of same color on the X-axes into a back-color data when the image data of same color are adjacently arranged on any one of the X-axes.

According to the same concept, color data of most marginal positions of plural adjacent image data of same color on the Y-axes can be converted into a black-color data when the image data of same color are adjacently arranged on any one of the Y-axes.

According to the electro-optical device thus constructed, such a clear image (data 3) as shown in FIG. 3 can be obtained without a high-speed displaying operation utilized in the conventional display device.

In the foregoing description, when plural image data of same color are adjacently arranged, the color data at the most marginal positions of the image data are converted into back-color data to obtain a clear image. In place of the color conversion, when plural image data of same luminance (light intensity) are adjacently arranged in a gradation displaying operation, the luminance (light intensity) data at the most marginal positions of the image data may be changed to high or low luminance (great or weak light intensity) data to obtain a clear image. This technique is applied to a case where when a high-luminance image (more retina-stimulating image) is displayed with a background of low luminance, a profile of the high-luminance image (that is, a more recognizable image) is further stressed (that is, the light intensity of the profile of the image is further intensified) to thereby bring an image to be displayed (e.g., a white letter) into relief from a background (e.g., a white background) and obtain a clear image.

Therefore, in this invention, not only color-conversion to back color, but also variation of luminance (light intensity) can be performed individually or in combination when plural same color image data are adjacently arranged on the display device.

In a combination of special colors, there is a case where colors other than black color are required as the color into which the color data of the most marginal positions of the adjacently-arranged image data should be converted. This invention is also applicable to this case by changing the color conversion to the black color to the color conversion to another color.

Methods obtained by generalizing a bit mathematically the above idea are as follows.

One method is to calculate an average brightness of input image data in a specific section and then to divide the specific section into areas having brightness of input image data not lower than the average brightness and areas having brightness of input image data not higher than the average brightness. And a maximal value (maximum value) and a minimal value (minimum value) of the areas are used as output data for displaying those areas. The discontinuous maximal and minimal values of those areas may be outputted, however, tone and brightness are steeply changed between the areas in this case, so that the image thus displayed might give an unnatural impression visually. This unnaturalness can be avoided by providing a transition section between the area of the maximal value and the area of the minimal value to connect the area of the maximal value to the area of the minimal value and vice versa by new data of the transition section which are continuously changed in the brightness thereof. For example, the gradient of input image data at a cross point of input image data with the average is calculated and then a straight line having the gradient and passing through the cross point is used as the image data for the transition section.

Another method is to calculate absolute values of a derived function of the input image data and to use, as output image data for a section sandwiched between addresses having absolute values showing peaks in the derived function, the input image data at the lowest absolute values in the same section in the derived function. In this case too, discontinuous brightness is displayed as in the above method, so that the problem as mentioned above can be overcome in the same way.

Further, another method is to calculate absolute values of a derived function of the input image data and to use, as output image data, data obtained by emphasizing only the adjacency of the absolute values showing peaks. That is, since tone and brightness of the image are transiting at the peak points of the absolute values of the derived function, the presence of the transition section can be emphasized by emphasizing the adjacency of the peak points.

The above methods are effective for emphasizing the boundary between adjacent areas having different tone and brightness. That is, in the above methods, the display device has a system to distinguish boundaries and to correct images in accordance with the boundaries by some mechanical or automatic means. The display device having such a system is effective not only as a usual office automation instruments but also as a display device for amusement.

For example, 525 scanning lines are used for TV broadcasting of NTSC system. When the width of the image plane is made 1.5 times as long as the height thereof to increase the horizontal resolution to 800 lines, which is 525 lines ×1.5, a wideband carrier wave of at least 30 MHz is required. However, only a few MHz was applied actually, so that it was impossible to transmit fine images. In particular, the image in the width direction became blurry or ambiguous though that in the height direction had high definition. This is because high frequency components of the image carrier wave band were cut, that is, image signals were made gentle.

On the other hand, the ambiguousness of images has not been recognized in the case of CRT system. Since the CRT system utilizes dot sequential scanning system, special high frequency circuit for processing signals, e.g. electron beam having such a high frequency as 30 MHz, is indispensable.

However, conditions are different in displays such as LCD and PDP which utilize line sequential scanning system. For example, in the devices such as LCD and PDP in 800×525 matrix as the above, image signals per column are processed parallel, so that the process time is 800 times as short as that of CRT system display. Hence, the above-mentioned image processing is considered to be suitable to, specifically, LCD and PDP.

BRIEF DESCRIPTION OF THE DRAWINGS

The accompanying drawings, which are incorporated in and from a part of the invention and together with the description, serve to explain the principle of the invention.

DETAILED DESCRIPTION OF THE INVENTION

Preferred embodiments of this invention will be described hereunder with reference to the accompanying drawings.

Embodiment 1

This embodiment will be described representatively in a case where a liquid crystal display device having 640×400 dots is used.

Figure 1:
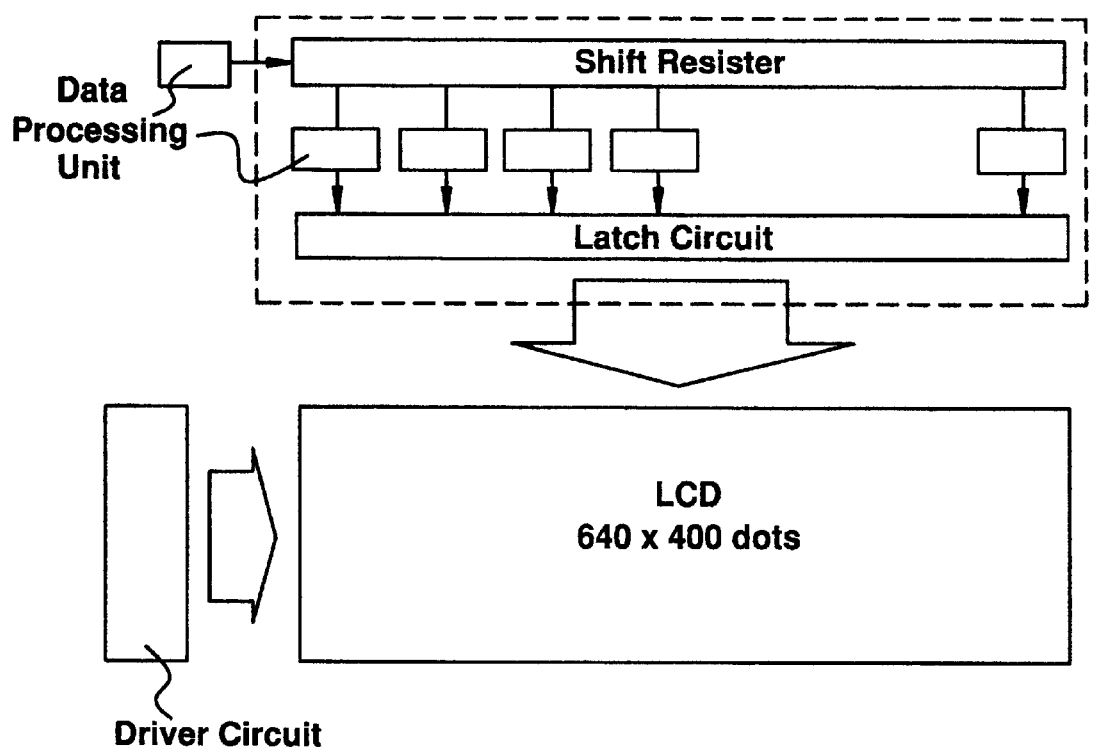
FIG. 1 shows the construction of a display device according to this invention.

In FIG. 1, the liquid crystal display device includes an X-axis driver and a Y-axis driver which is enclosed by a dotted line in FIG. 1. These drivers are connected to a liquid crystal matrix (LCD in FIG. 1) and a signal line for transmitting a data is provided for the Y-axis driver.

Figure 2A:
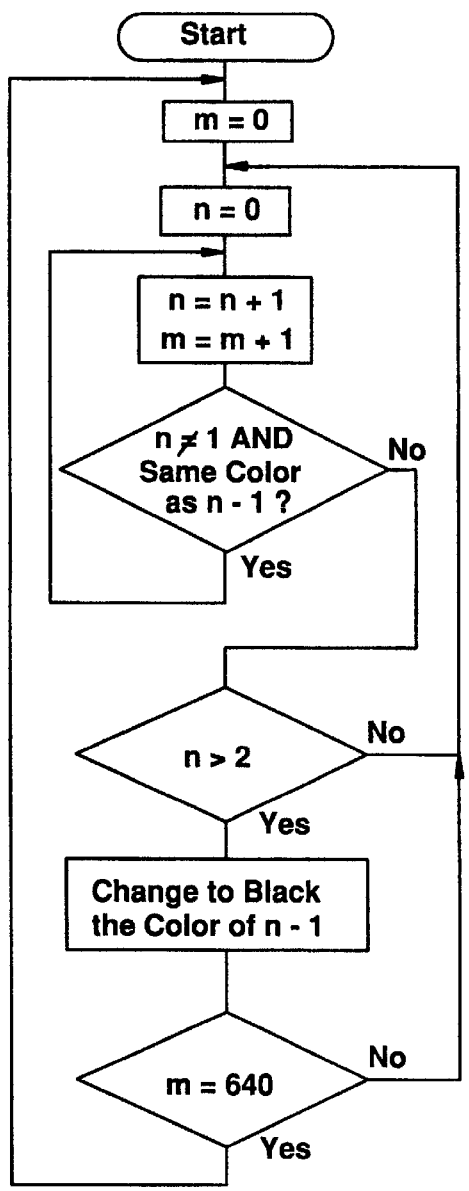
FIGS. 2(A) and 2(B) are flowcharts for a system of this invention.
Figure 2B:
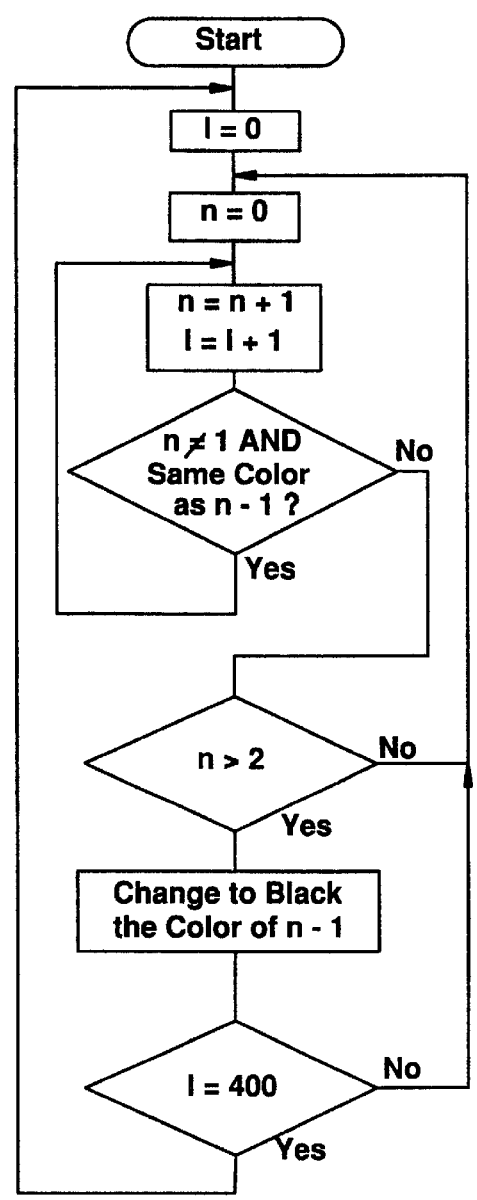

A data processing unit *A successively carries out a data processing for an input data in accordance with a flowchart as shown in FIG. 2(A) to transmit the processed data to the Y-axis driver which is enclosed by a dotted line in FIG. 1. A data processing unit *B successively carries out a data processing for an input data in accordance with a flowchart as shown in FIG. 2(B) to transmit the processed data to a Y-axis electrode.

Figure 2C:
FIG. 2(C) shows an example of data processing of the present invention.
Figure 3:
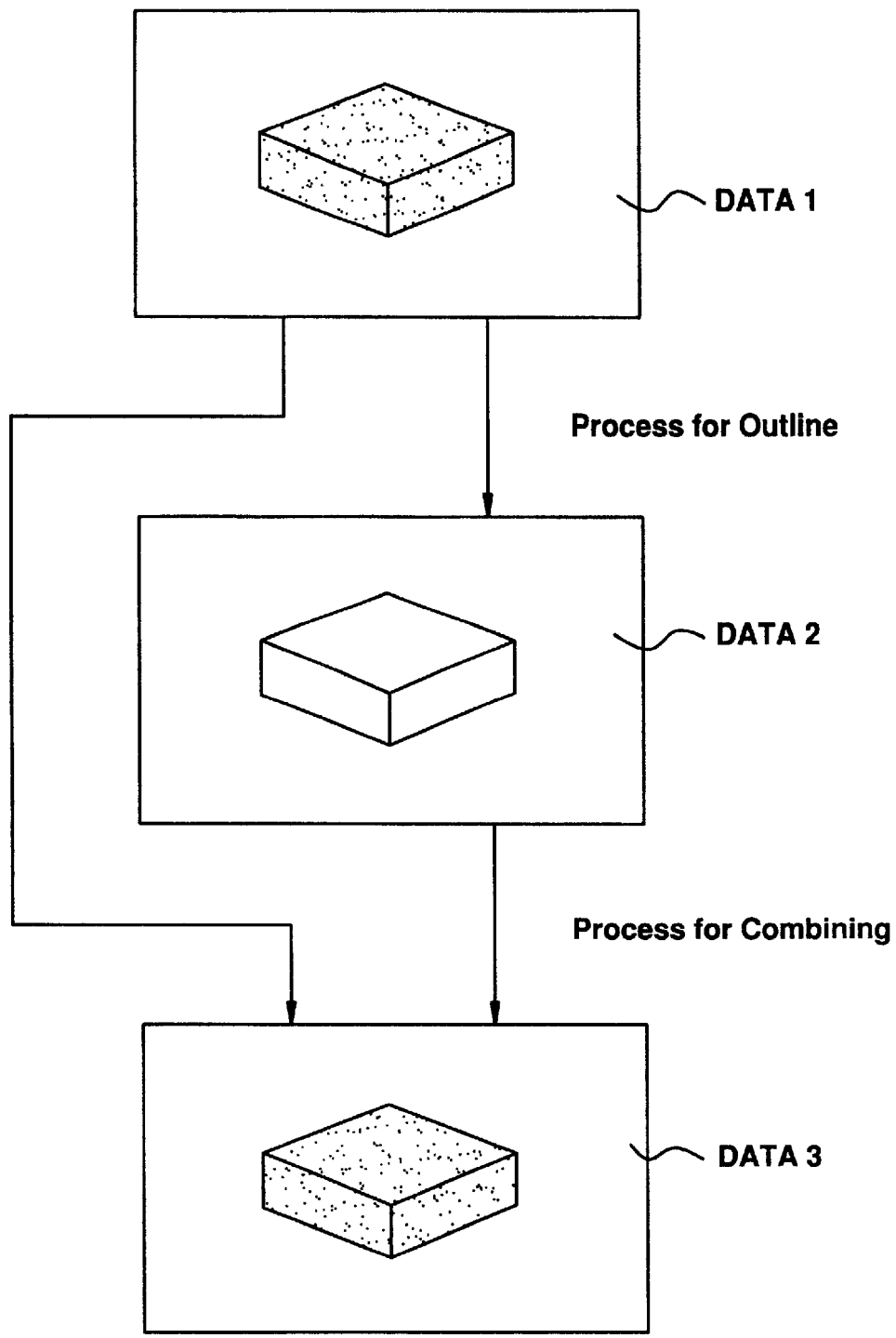
FIG. 3 shows an example of data processing.

Referring to FIG. 2(C), a data which is actually utilized is shown. Three red color dots (R) are successively arranged from the left end of the dot row, and a green color dot is next arranged adjacent to the red color dot. Therefore, the third red color dot from the left end of the dot row is subjected to the data processing to be changed to a black color data (BL). Similarly, the tenth dot having green color and the thirteenth dot having blue color from the left end of the dot row are changed to black color dots, respectively. However, the second dot having blue color and the first dot having red color from the right end of the dot row are not changed, as shown in FIG. 2(C), because these color dots does not have the same color.

In this embodiment, ferroelectric liquid crystal is used for the liquid crystal display device. However, the effect of this invention can be obtained using STN, TN or dispersing type liquid crystal display device, EL display device, plasma display device, Embodiment 2

Figure 4A:
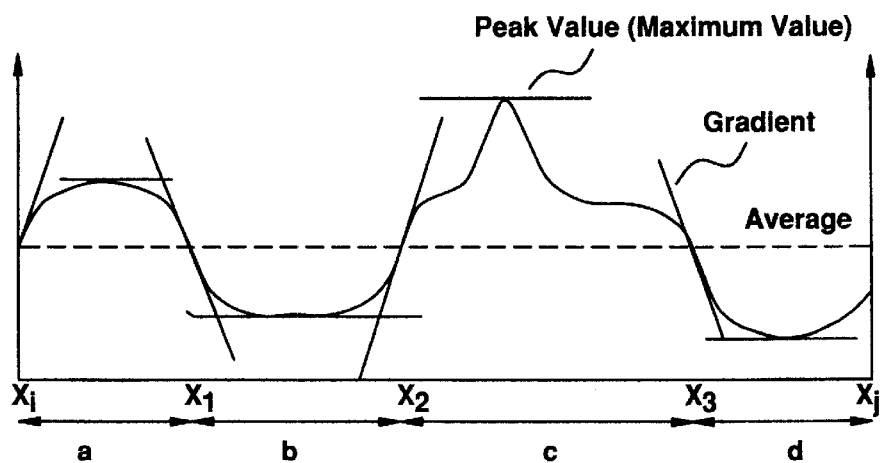
FIG. 4 shows an example of data processing of the present invention.

This embodiment shows an example of image processing in one section from $X_i$ to $X_j$ of one row in an image. 3 pixels or more are necessary in this section, however, 20 pixels or more are desirable in the sense of mathematical process. Alternatively, one entire image plane may be an object. Data to be inputted in this section are illustrated in FIG. 4(A). Firstly, an average value is calculated with respect to the brightness of the data inputted in this section and is indicated with a dotted line in FIG. 4(A). Then, this section is divided into areas having a data higher than the average and lower than the average, respectively, namely, area a ($X_i$ to $X_1$), area b ($X_1$ to $X_2$), area c ($X_2$ to $X_3$), and area D ($X_3$ to $X_j$), as in the figure. The maximum value in the area a, the minimum value in the area b, the maximum value in the area c, and the minimum value in the area d are to be used as output image data for this section. One example is illustrated with a chain line in FIG. 4(B).

Figure 4B:
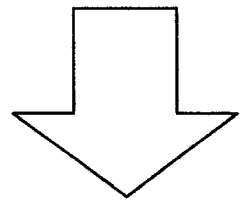
Figure 4B:
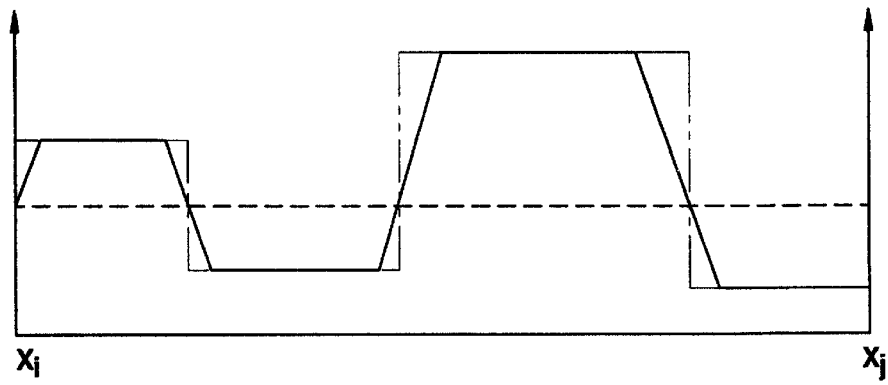

However, since the values of the output data are discontinuous, processed image tends to give an unnatural impression visually. In order to remove this discontinuity, the output values in the areas are connected to each other by a straight line having an appropriate gradient, to make them continuous. The appropriate gradient is the gradient of the input data at each point of $X_1$, $X_2$, and $X_3$, which are the boundary between the areas. Concretely, a straight line having the gradient of such each point and passing through such each point is utilized. This straight line is connected to the maximum and minimum values in the areas, whereby data illustrated with a full line (solid line) in FIG. 4(B) is obtained and used as output image data.

Embodiment 3

Figure 5A:
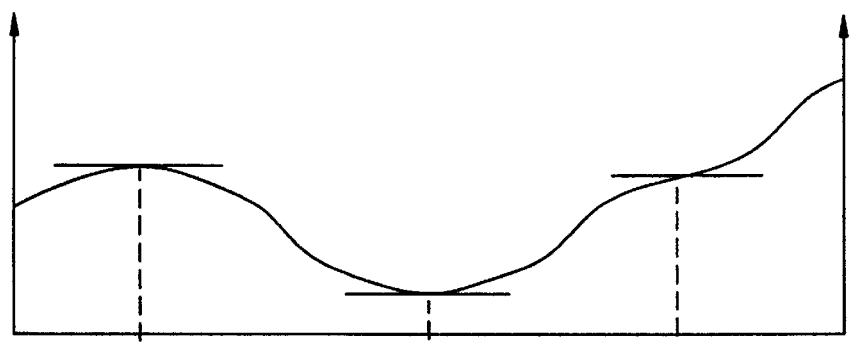
FIG. 5 shows an example of data processing of the present invention.
Figure 5B:
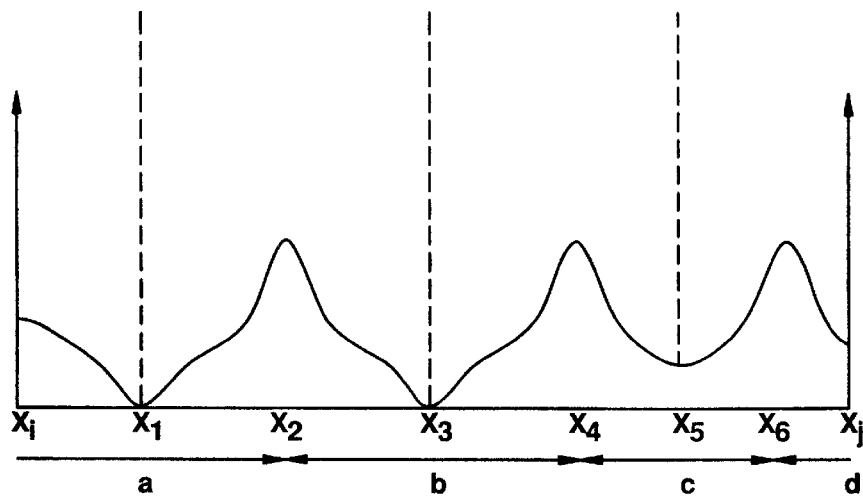

This embodiment shows the process of operating (calculating) an output image data, based on a derived function of an input image data. In the same way as in Embodiment 2, data shown in FIG. 5(A) is inputted from pixel $X_i$ to pixel $X_j$ of one row. This data is immediately subjected to differential or other equivalent operation, to obtain a derived function thereof. Absolute values of the derived function thus obtained are as shown in FIG. 5(B). The simplest way of calculating the derived function is to calculate the difference between the input image data $f(X_k)$ and $f(X_{k+1})$ of adjacent pixels $X_k$ and $X_{k+1}$.

Figure 5C:
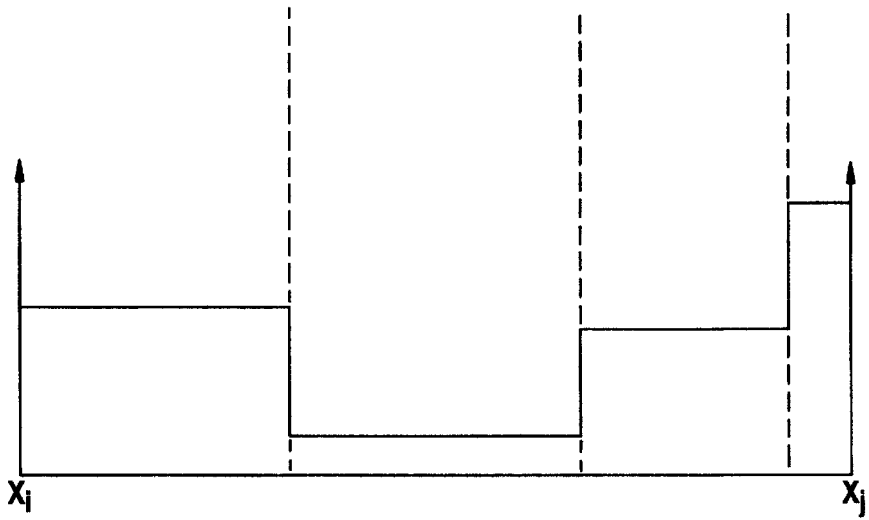

In FIG. 5(B), the absolute value of the derived function at each of $X_2$, $X_4$, and $X_6$ shows a peak (is maximal), and the absolute value at each of $X_1$, $X_3$, and $X_5$ is minimal. Then, areas sandwiched between these peak values are defined as area a (the left area to $X_2$), area b ($X_2$ to $X_4$), area c ($X_4$ to $X_6$), and area d (the right area from $X_6$). Utilized as an output data for each area is an input data having a minimum absolute value of each area in the derived function. For example, input data $f(X_1)$ at $X_1$ is used as output data of the area a and input data $f(X_3)$ at $X_3$ is used as output data in the area b. The absolute values of the derived function at $X_1$ and $X_3$ are zero, which means the maximum or minimum value in the respective section as shown in FIG. 5(A). On the other hand, an input data $f(X_5)$ at $X_5$ is used as output data in the area c, and it should be noted that $f(X_5)$ is neither the maximum nor minimum values in the section. The output data processed in the above manner is as illustrated in FIG. 5(C).

It is not necessary in this embodiment to divide an input image data into some sections like in Embodiment 2. In Embodiment 2, in the case that the specified section is too large, for example, in the case that the data in one row is defined as one section, if the average value in the row is different from that in the next row, the output signals might become largely different though the difference between the input signals is small. Inversely, if the specified section is too small, the object of the present invention, namely to display clear images with clear profiles, cannot be achieved sufficiently. For example, although the structure in the area c in FIG. 4(A) is very complicated, it is irresistible that this structure is ignored, because the value in each area is mechanically judged to be higher or lower than the average value of the specified section.

On the other hand, this embodiment does not include the process of calculating an average value after specifying the section, so that even a complicated structure in a small part, sufficiently smaller than the specified section in Embodiment 2, can be caught and thereby the unnaturalness of images can be reduced.

Embodiment 4

Figure 6A:
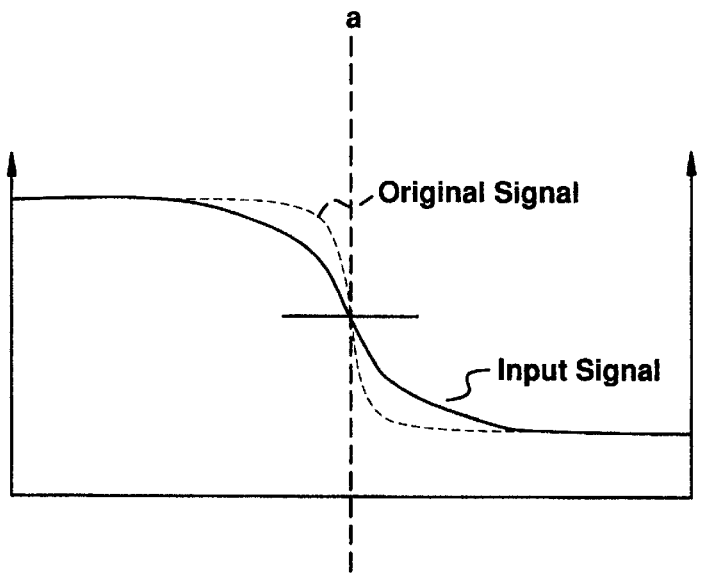
FIG. 6 shows an example of data processing of the present invention.
Figure 6B:
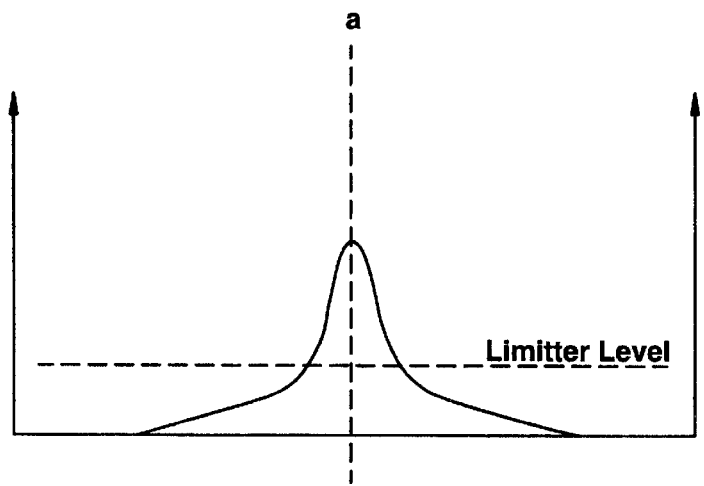
Figure 6C:
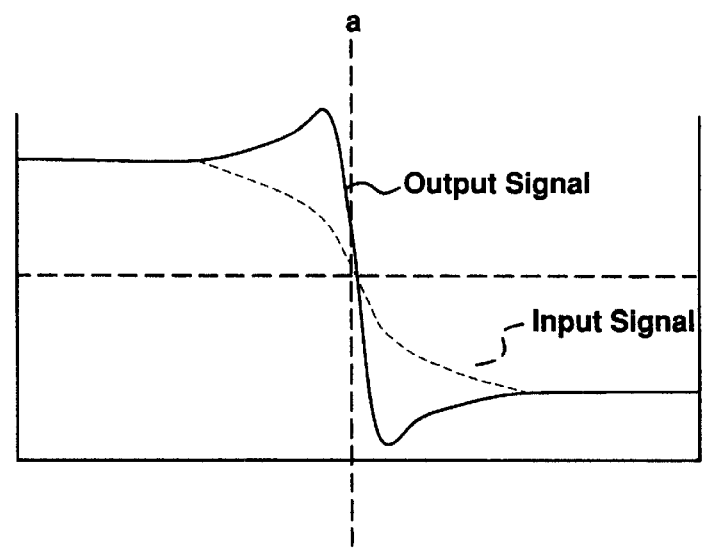

This embodiment is explained with reference to FIG. 6. In a TV broadcasting for example, it is difficult to transmit a signal of a boundary at which a signal value is steeply changed because the frequency band which can be utilized for broadcasting is limited, as mentioned above. In order to transmit a boundary image, e.g. a boundary line image having original signal described with a dotted line in FIG. 6(A), quite a lot of high frequency components are required. However, although the original signal is as described with a dotted line in FIG. 6(A), the image signal actually received and processed is transformed as illustrated with a full line (solid line) in FIG. 6(A).

If such a transformed image signal is outputted as it is, the image obtained becomes ambiguous and unclear. Therefore, it is required to restore the transformed image signal to a signal close to the original one by some way. For this reason, it is attempted in this embodiment to output an image signal close to an original signal by distinguishing a boundary and emphasizing an image signal at the boundary.

For distinguishing boundaries, a derived function of an input signal is calculated, and peak points of absolute values of the derived function are distinguished as boundaries. In other words, the points where a signal value is steeply changed may be considered as boundaries. In this case however, the absolute value of the derived function might show a peak even though the signal value is changed gently. A portion where the change of the signal value is gentle should be excluded from the emphasizing because it is hard to consider that an original signal has a steep change at such a portion. A limiter level (threshold level) of the absolute value of the derived function may be decided in order to define as a boundary only the peak which exceeds the limiter level.

After thus distinguishing a boundary, the input signal value at the boundary (designated by a in FIG. 6) is processed to emphasize the boundary. For example, when an input signal value is f(X) at an arbitrary point X located near the boundary, the value g(X) can be used as an output signal, which is calculated with the following formula:

$$g(X)=f(a)+[f(X)-f(a)]exp[1/(X-a)^2] \ (X \neq a).$$

More generally, $$g(X)=f(a)+[f(X)-f(a)]h(X-a) \ (X \neq a).$$

The function h(X) is converged to 1 when X is infinitude or infinitesimal, and when X=0, the function h(X) becomes infinitude or finite positive value.

In a practical manner, however, such a full calculation is not carried out. After distinguishing a boundary in pixels in the above-mentioned way, the difference [f(X)−f(a)] is multiplied by a specific value for every distant pixel and then f(a) is added to the result of the multiplication, to thereby obtain an output signal. For example, in the case that the pixel $X_k$ is distinguished as a boundary, the adjacent pixel $X_{k+1}$ is multiplied by 2.72, $K_{k+2}$ by 1.28, $X_{k+3}$ by 1.12, $X_{k+4}$ by 1.08, $X_{k+5}$ by 1.04, $X_{k+6}$ by 1.03, and $X_{k+7}$ and $X_{k+8}$ by 1.02, respectively, and further distant pixels are not subjected to the multiplication process. The same process is carried out to the pixels located in the inverse direction of the above pixels, i.e., $X_{k-1}$, $X_{k-2}$, $X_{k-3}$, $X_{k-4}$, $X_{k-5}$, $X_{k-6}$, $X_{k-7}$, and $X_{k-8}$. This process is substantially the same as in the case of $h(X)=exp(1/X^2)$ in the above formula.

Alternatively, more simple flowchart may be substituted for such a mathematically severe restoration. That is, the pixel adjacent to the pixel distinguished as a boundary is multiplied by 10, the second pixel from the boundary pixel by 5, the third one by 3, the fourth one by 2, the fifth one by 1.5, the sixth one by 1.2, and the seventh one by 1.1, respectively, and further distant pixels are not subjected to the multiplication process.

This embodiment has the same technical idea as Embodiment 1, and is characterized by distinguishing a boundary mathematically and processing not only the pixel distinguished as the boundary but also the neighboring pixels in one specific area. Unlike Embodiments 2 and 3, signals in the area other than the boundary portion are not regulated uniformly, therefore continuous change of fine tone and brightness can be maintained.

As explained hereinbefore, in accordance with the method of the present invention, an area having plurality of dots being of the same color or the same brightness can be automatically distinguished and the boundary portion is emphasized by outlining the end portion of the area with black or by the calculation process. By virtue of this emphasizing process, the gentle transition is removed, whereby mixture of colors can be prevented and a clear image can be displayed.

In Embodiment 1, the process of signals is carried out while data are transmitted to an image display device such as LCD and PDP. Hence, the process speed is not lowered, and accordingly the process is applicable to an image moving at high speed. In the other embodiments, the process needs a bit longer period of time, however, it does not become a problem if every column can be processed parallel in one image plane like LCD and PDP.

What is claimed is:

1. A method for displaying an image comprising:

calculating an average brightness of addresses between two addresses in an original image from original image data;

calculating maximal and minimal brightness in said original image from said original image data;

converting the original image data into new data having brightness which varies with address from one of the maximal brightness and the minimal brightness to the other and is a linear function of address with said linear function satisfying brightness nearest to the average brightness in the variation, said conversion into said new data being carried out for addresses at which said brightness being said linear function is smaller than the maximal brightness and is larger than the minimal brightness;

converting the original image data into new data having the maximal brightness for an address having the original image data of brightness larger than the average brightness except for said addresses at which said brightness being said linear function is smaller than the maximal brightness and is larger than the minimal brightness; and converting the original image data into new data having the minimal brightness for an address having the original image data of brightness smaller than the average brightness except for said addresses at which said brightness being said linear function is smaller than the maximal brightness and is larger than the minimal brightness.

2. The method according to claim 1, wherein an electroluminescence display is operated by said method.

3. A method of driving a display device comprising:

providing an image signal to display a boundary image wherein a level of the image signal decreases from a first level to a second level in the vicinity of a point corresponding to the boundary image;

increasing the magnitude of the image signal to a level higher than said first level at a point which includes said first level; and decreasing the magnitude of the image signal to a level lower than said second level at a point which includes said second level.

4. The method according to claim 3 wherein said display device is a liquid crystal device.

5. The method according to claim 3 wherein said display device is a plasma device.

6. The method according to claim 3 wherein said display device is an electroluminescence device.

7. A method of driving a display device comprising:

determining a boundary of an image signal where a magnitude of an image signal decreases from a first level to a second level;

increasing the magnitude of the image signal to a level higher than said first level at a point which includes said first level; and decreasing the magnitude of the image signal to a level lower than said second level at a point which includes said second level.

8. The method according to claim 7 wherein said display device is a liquid crystal device.

9. The method according to claim 7 wherein said display device is a plasma device.

10. The method according to claim 7 wherein said display device is an electroluminescence device.

11. A method of driving a display device comprising:

calculating a derived function of an image signal;

determining a boundary of an image signal where a magnitude of an image signal decreases from a first level to a second level based on absolute values of the derived function;

increasing the magnitude of the image signal to a level higher than said first level at a point which includes said first level; and decreasing the magnitude of the image signal to a level lower than said second level at a point which includes said second level.

12. The method according to claim 11 wherein said display device is a liquid crystal device.

13. The method according to claim 11 wherein said display device is a plasma device.

14. The method according to claim 11 wherein said display device is an electroluminescence device.

15. A method of driving a display device comprising:

detecting a change in an image signal from a first level to a second level, said change corresponding to a boundary of an image represented by said image signal increasing the magnitude of said first level of said image signal to a level higher than said first level; and decreasing the magnitude of said second level of said image signal to a level lower than said second level.

16. The method according to claim 15 wherein said display device is a liquid crystal device.

17. The method according to claim 15 wherein said display device is a plasma device.

18. The method according to claim 15 wherein said display device is an electroluminescence device.

* * * * *